(12) United States Patent
Sun et al.

(10) Patent No.: US 12,114,100 B2
(45) Date of Patent: Oct. 8, 2024

(54) IMAGE PROCESSING METHOD IN REMOTE CONTROL, DEVICE, APPARATUS AND PROGRAM PRODUCT

(71) Applicant: Beijing Baidu Netcom Science Technology Co., Ltd., Beijing (CN)

(72) Inventors: Qingrui Sun, Beijing (CN); Jingchao Feng, Beijing (CN); Liming Xia, Beijing (CN); Zhuo Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 415 days.

(21) Appl. No.: 17/519,375

(22) Filed: Nov. 4, 2021

(65) Prior Publication Data

US 2022/0058771 A1 Feb. 24, 2022

(30) Foreign Application Priority Data

Dec. 22, 2020 (CN) .......................... 202011525076.8

(51) Int. Cl.
*G06K 9/00* (2022.01)
*G05D 1/00* (2006.01)
(Continued)

(52) U.S. Cl.
CPC ........... *H04N 7/181* (2013.01); *G05D 1/0246* (2013.01); *G06T 3/4038* (2013.01); *G06T 9/00* (2013.01);
(Continued)

(58) Field of Classification Search
CPC . G06T 2207/30248; G06T 2207/30256; G06T 2207/30252; G06T 3/4038;
(Continued)

(56) References Cited

U.S. PATENT DOCUMENTS

| 11,715,180 B1* | 8/2023 | Chen ......................... B60R 1/12 382/106 |
| 2016/0105649 A1* | 4/2016 | Pettegrew ................. G06T 3/18 348/37 |

(Continued)

FOREIGN PATENT DOCUMENTS

| CN | 105869119 A | 8/2016 |
| CN | 108428357 A | 8/2018 |

(Continued)

OTHER PUBLICATIONS

Extended European Search Report corresponding to European Patent Application No. 21206126.1, dated Apr. 28, 2022 (7 pages).
(Continued)

*Primary Examiner* — Atiba O Fitzpatrick
(74) *Attorney, Agent, or Firm* — Maginot, Moore & Beck LLP

(57) ABSTRACT

An image processing method in remote control, a device, an apparatus and a program product are provided and related to the field of automatic driving technologies. The specific implementation solution includes receiving image information sent by a vehicle, wherein the image information includes multiple-channel image data collected by the vehicle; performing a stitching process on the multiple-channel image data, to obtain a stitched image; sending the stitched image to a remote cockpit apparatus for controlling the vehicle.

10 Claims, 3 Drawing Sheets

(51) Int. Cl.
    *G06T 3/4038*     (2024.01)
    *G06T 9/00*     (2006.01)
    *G06V 10/46*     (2022.01)
    *G06V 10/80*     (2022.01)
    *H04L 65/61*     (2022.01)
    *H04N 7/18*     (2006.01)

(52) U.S. Cl.
    CPC ............ *G06V 10/462* (2022.01); *G06V 10/80* (2022.01); *H04L 65/61* (2022.05)

(58) Field of Classification Search
    CPC ........... G06T 11/60; G06T 2207/20212; G06T 2207/20216; G06T 2207/20221; G06T 3/00–20; G06T 7/246; G06T 7/248; G06T 7/251; G06T 7/292; G06T 3/14; G06T 3/147; G06T 3/153; G06V 20/56; G06V 20/58; G06V 20/582; G06V 20/584; G06V 20/588; G06V 10/80; G06V 10/46; G06V 10/462; G06V 10/464; B64C 39/024; G05D 1/0246; H04N 7/185; H04N 7/181; H04N 7/183; G06F 18/25
    See application file for complete search history.

(56) References Cited

U.S. PATENT DOCUMENTS

| | | | | |
|---|---|---|---|---|
| 2016/0332574 | A1* | 11/2016 | Park | H04N 7/181 |
| 2017/0187955 | A1 | 6/2017 | Fink et al. | |
| 2017/0251181 | A1* | 8/2017 | Smolyanskiy | B64C 39/024 |
| 2017/0345129 | A1 | 11/2017 | Doshi et al. | |
| 2018/0158220 | A1 | 6/2018 | Henricus et al. | |
| 2019/0056748 | A1 | 2/2019 | Budihal et al. | |
| 2019/0302760 | A1 | 10/2019 | Katou et al. | |
| 2019/0325580 | A1* | 10/2019 | Lukac | G06T 3/4038 |
| 2020/0154025 | A1* | 5/2020 | Wakatsuki | H04N 23/71 |
| 2020/0265243 | A1* | 8/2020 | Yan | G06V 20/56 |
| 2020/0314333 | A1* | 10/2020 | Liang | H04N 7/181 |
| 2020/0322531 | A1 | 10/2020 | Feng et al. | |
| 2020/0348665 | A1* | 11/2020 | Bhanushali | H04N 19/167 |
| 2021/0134154 | A1 | 5/2021 | Wang et al. | |
| 2021/0174471 | A1* | 6/2021 | Kuang | H04N 23/60 |

FOREIGN PATENT DOCUMENTS

| | | | |
|---|---|---|---|
| CN | 108495089 | A | 9/2018 |
| CN | 109101014 | A | 12/2018 |
| CN | 109509153 | A | 3/2019 |
| CN | 109739157 | A | 5/2019 |
| CN | 109808705 | A | 5/2019 |
| CN | 110276717 | A | 9/2019 |
| CN | 110620874 | A | 12/2019 |
| CN | 110942023 | A | 3/2020 |
| CN | 210454716 | U | 5/2020 |
| CN | 111489288 | A | 8/2020 |
| CN | 111634234 | A | 9/2020 |
| CN | 111736604 | A | 10/2020 |
| CN | 111741259 | A | 10/2020 |
| CN | 111783502 | A | 10/2020 |
| JP | 2007049276 | A | 2/2007 |
| JP | 2018515840 | A | 6/2018 |
| KR | 20090042678 | A | 4/2009 |
| KR | 20150064913 | A | 6/2015 |
| WO | 2018079028 | A1 | 5/2018 |
| WO | 2020151468 | A1 | 7/2020 |

OTHER PUBLICATIONS

Li, Nan, Yifang Xu, and Chao Wang. "Quasi-homography warps in image stitching." IEEE transactions on multimedia 20.6 (2017).
Chinese Office Action corresponding to Chinese Patent Application No. 202011525076.8, dated Jul. 15, 2022 (10 pages).
English Translation of Chinese Office Action corresponding to Chinese Patent Application No. 202011525076.8, dated Jul. 15, 2022 (5 pages).
English Translation of CN105869119A. (11 Pages).
English Translation of CN109101014A. (26 Pages).
English Translation of CN109739157A. (14 Pages).
English Translation of CN109808705A. (23 Pages).
English Translation of CN110276717A. (32 Pages).
English Translation of CN110942023A. (33 Pages).
English Translation of CN111489288A. (29 Pages).
English Translation of CN111634234A. (20 Pages).
English Translation of CN111736604A. (26 Pages).
English Translation of CN111783502A. (29 Pages).
English Translation of CN210454716U. (16 Pages).
English Translation of WO2020151468A1. (58 Pages).
Japanese Office Action corresponding to Japanese Patent Application No. 2021-180515, dated Jan. 4, 2023 (9 pages).
English Translation of Japanese Office Action corresponding to Japanese Patent Application No. 2021-180515, dated Jan. 4, 2023 (7 pages).
Korean Office Action corresponding to Korean Patent Application No. 1020210089825, dated Jan. 19, 2023 (5 pages).
English Translation of Korean Office Action corresponding to Korean Patent Application No. 1020210089825, dated Jan. 19, 2023 (5 pages).
English Machine Translation of JP2007049276A. (22 Pages).
English Machine Translation of KR20090042678A. (8 Pages).
English Machine Translation of KR20150064913A. (19 Pages).
Machine Translation of CN108495089A. (30 Pages).
Machine Translation of CN110620874A. (20 Pages).
Machine Translation of CN111741259A. (25 Pages).

* cited by examiner ately, the scope of the present disclosure will become comprehensible with reference to the following description.

IMAGE PROCESSING METHOD IN REMOTE CONTROL, DEVICE, APPARATUS AND PROGRAM PRODUCT

CROSS-REFERENCE TO RELATED APPLICATION

The present application claims a priority to the Chinese patent application No. 202011525076.8 filed in China on Dec. 22, 2020, a disclosure of which is incorporated herein by reference in its entirety.

TECHNICAL FIELD

The present disclosure relates to the field of computer technologies, in particular to the field of automatic driving technologies.

BACKGROUND

With development of automatic driving technology, more and more vehicles now support intelligent driving. For example, private cars, buses, trucks and other vehicles may support intelligent driving, and these intelligent driving may be remote control or vehicle automatic driving. At present, the vehicle intelligent driving is mainly based on images collected by a vehicle to achieve vehicle driving. It is mainly in remote control driving technology that the vehicle sends the images to a remote cockpit apparatus respectively, and the remote cockpit apparatus performs remote driving control based on these images.

SUMMARY

The present disclosure provides an image processing method in remote control, a device, an apparatus and a program product.

According to an aspect of the present disclosure, an image processing method in remote control is provided, and the method is performed by a cloud apparatus and includes: receiving image information sent by a vehicle, wherein the image information includes multiple-channel image data collected by the vehicle; performing a stitching process on the multiple-channel image data, to obtain a stitched image; sending the stitched image to a remote cockpit apparatus for controlling the vehicle.

According to another aspect of the present disclosure, an image processing device in remote control is provided, wherein the device is applied to a cloud apparatus and includes: a reception module, configured to receive image information sent by a vehicle, wherein the image information includes multiple-channel image data collected by the vehicle; a stitching module, configured to perform a stitching process on the multiple-channel image data, to obtain a stitched image; a sending module, configured to send the stitched image to a remote cockpit apparatus for controlling the vehicle.

According to another aspect of the present disclosure, the present disclosure provides an electronic apparatus, and the electronic apparatus includes: at least one processor; and a storage communicatively connected to the at least one processor, wherein, the storage stores an instruction executable by the at least one processor, the instruction is performed by the at least one processor to enable the at least one processor to perform the image processing method in remote control provided in the present disclosure.

According to another aspect of the present disclosure, a non-transitory computer readable storage medium storing therein computer instructions is provided, wherein the computer instructions are used for causing a computer to perform the image processing method in remote control provided in the present disclosure.

According to another aspect of the present disclosure, a computer program product is provided, wherein in a case that the computer program product is executed on an electronic apparatus, the electronic apparatus performs the image processing method in remote control provided in the present disclosure.

According to another aspect of the present disclosure, a cloud apparatus including the electronic apparatus provided in the present disclosure is provided.

According to the technical solution of the present disclosure, the remote driving effect of the remote cockpit apparatus may be improved since the cloud apparatus stitches the multiple-channel image data sent by the vehicle and sends the stitched image to the remote cockpit apparatus.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The drawings are used to better understand the solutions of the present disclosure and constitute no limitation to the present disclosure. Where.

DETAILED DESCRIPTION

In the following description, numerous details of the embodiments of the present application, which should be deemed merely as exemplary, are set forth with reference to accompanying drawings to provide thorough understanding of the embodiments of the present application. Therefore, those skilled in the art will appreciate that modifications and replacements may be made in the described embodiments without departing from the scope and the spirit of the present application. Further, for clarity and conciseness, descriptions of known functions and structures are omitted hereinafter.

In the following description, numerous details of the embodiments of the present application, which should be deemed merely as exemplary, are set forth with reference to accompanying drawings to provide thorough understanding of the embodiments of the present application. Therefore, those skilled in the art will appreciate that modifications and replacements may be made in the described embodiments without departing from the scope and the spirit of the present application. Further, for clarity and conciseness, descriptions of known functions and structures are omitted hereinafter.

Figure 1:
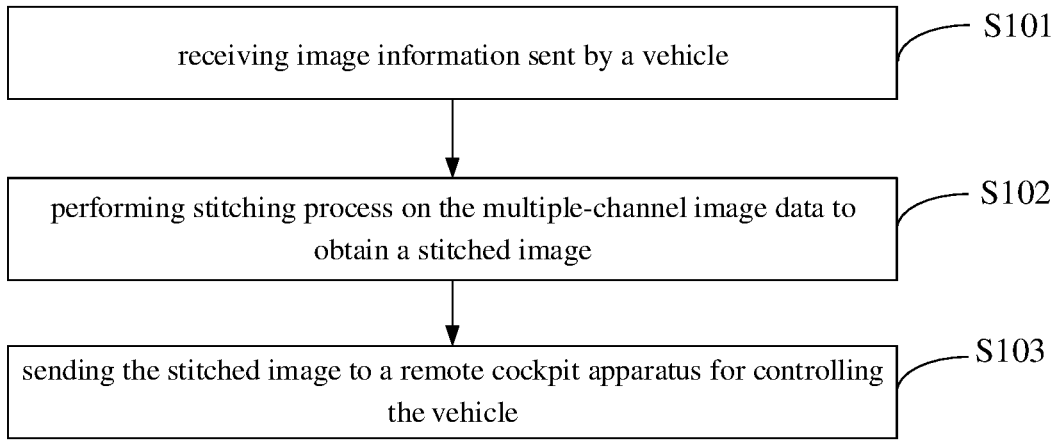
FIG. 1 is a schematic flowchart of an image processing method in remote control provided in the present disclosure.

Referring to FIG. 1, FIG. 1 is a schematic flowchart of an image processing method provided in the present disclosure, and the method is performed by a cloud apparatus. As shown in FIG. 1, the method includes the following steps.

Step S101, receiving image information sent by a vehicle, wherein the image information includes multiple-channel image data collected by the vehicle.

The image information may be image information sent by the vehicle in real time. For example, image information is sent by the vehicle through a 5G or 6G network.

The multiple-channel image data may be image data collected by multiple cameras of the vehicle, and each channel of image data corresponds to one camera. For example, three channels of image data is collected by the front, left-side and right-side cameras of the vehicle. The above image data may be video image data, such as three channels of video image data. Front image data may be wide-viewing distance image data.

The vehicle in the present disclosure may be an unmanned vehicle, e.g., an unmanned car, an unmanned bus, an unmanned truck, etc. These unmanned vehicles may be remotely controlled by a remote cockpit apparatus at a remote end. Remote control may be remote driving of the vehicle throughout an entire process, or remote takeover of part of the driving during the vehicle automatic driving, i.e. the vehicle may support both automatic driving and remote control driving.

Step S102, performing a stitching process on the multiple-channel image data, to obtain a stitched image.

After the cloud apparatus acquires the multiple-channel image data, the cloud apparatus stitches the multiple-channel image data to obtain an image. For example, overlapping image data in the multiple-channel image data is fused to obtain the stitched image by stitching.

In addition, the stitching may be stitched in frames. For example, image frames belonging to the same time point in the multiple-channel image data sent by the vehicle are stitched together to obtain a frame of stitched image.

Step S103, sending the stitched image to a remote cockpit apparatus for controlling the vehicle.

The remote cockpit apparatus for controlling the vehicle may be, an apparatus for remotely driving the vehicle, the apparatus includes a display device for displaying the stitched image, such that a user of the remote cockpit apparatus may understand the current environment of the vehicle based on the displayed stitched image and remotely control the vehicle.

After the cloud apparatus acquires the stitched image, the cloud apparatus may transmit the stitched image to the remote cockpit apparatus in real time. For example, the stitched image is sent to the remote cockpit apparatus through 5G or 6G network.

The cloud apparatus sends to the remote cockpit apparatus the stitched image obtained by stitching multiple-channel image data, so that the remote cockpit apparatus only needs to display the stitched image and the user of the remote cockpit apparatus only needs to view the stitched image to understand the multiple-channel image data of the vehicle, thus improving the remote driving effect of the remote cockpit apparatus. The stitching is done by the cloud apparatus, this takes advantage of a high computing performance of the cloud apparatus, thus reducing a time delay of the vehicle-collected images transmitted to the remote cockpit apparatus.

The cloud apparatus in the present disclosure may be a cloud electronic apparatus such as a server, or a calculator, etc.

As an optional embodiment, receiving the image information sent by the vehicle includes: receiving first image compression information sent by the vehicle via real-time communication (RTC), wherein the first image compression information includes the multiple-channel image data collected by the vehicle; performing the stitching process on the multiple-channel image data, to obtain the stitched image includes: performing a decompression process on the first image compression information to obtain the multiple-channel image data, and performing the stitching process on the multiple-channel image data to obtain the stitched image.

The receiving the first image compression information sent by the vehicle via RTC may refer to that the cloud apparatus receives the first image compression information, sent by the vehicle using an RTC service, through the RTC service. The first image compression information may be image compression information obtained by compressing the multiple-channel image data after the multiple-channel image data were obtained by the vehicle, such as compressed images using the h264 compression technology. The specific compression technology is not limited in the present disclosure. For example, the h263 compression technology may also be used for compression.

In the present embodiment, the image compression information is transmitted via RTC, which reduces transmission latency between the vehicle and the cloud apparatus, and improves safety of remote driving of the vehicle from the remote cockpit apparatus.

It should be noted that, the present disclosure does not limit the cloud apparatus to receiving the first image compression information sent by the vehicle via RTC. For example, the cloud apparatus may receive the first image compression information sent by the vehicle via other communication technology, or the cloud apparatus may receive multiple-channel uncompressed image data sent by the vehicle via RTC.

As an optional embodiment, the multiple-channel image data includes a first channel image data, a second channel image data and a third channel image data, performing the stitching process on the multiple-channel image data to obtain the stitched image includes: extracting a first common pixel point of the first channel image data and the second channel image data; creating a first coordinate system based on the first common pixel point, mapping the first channel image data to the first coordinate system to obtain first image mapping data, and mapping the second channel image data to the first coordinate system to obtain second image mapping data; replicating the first image mapping data and the second image mapping data into a first blank image, respectively, and performing weighted fusion of overlapping image data of the first image mapping data and the second image mapping data in the first blank image to obtain a first stitched sub-image; extracting a second common pixel point of the third channel image data and the second channel image data; creating a second coordinate system based on the second common pixel point, mapping the third channel image data to the second coordinate system to obtain third image mapping data, and mapping the second channel image data to the second coordinate system to obtain fourth image mapping data; replicating the third image mapping data and the fourth image mapping data into a second blank image, respectively, and performing weighted fusion of overlapping image data of the third image mapping data and the fourth image mapping data in the second blank image to obtain a second stitched sub-image; stitching the first stitched sub-image and the second stitched sub-image to obtain the stitched image.

The first channel image data may be image data collected by a camera which is used by the vehicle to capture left-side or right-side images. The second channel image data may be image data collected by a camera which is used by the vehicle to capture images in front of the vehicle, and the camera may be a wide-viewing distance camera. The third channel image data may be image data collected by a camera which is used by the vehicle to capture right-side or left-side images.

The extracting the first common pixel point of the first channel image data and the second channel image data may refer to that the same multiple pixel points in the first channel image data and the second channel image data are extracted. In practice, each image has its unique pixel points, and these pixel points may be understood as feature points of that image. In the present disclosure, there is a repeat region in the first channel image data and the second channel image data, such as a region 201 shown in FIG. 2. Thus, pixel points of this repeat region are extracted in the first channel image data and the second channel image data to obtain the first common pixel points mentioned above, and these pixel points are present in both the first channel image data and the second channel image data.

Figure 2:
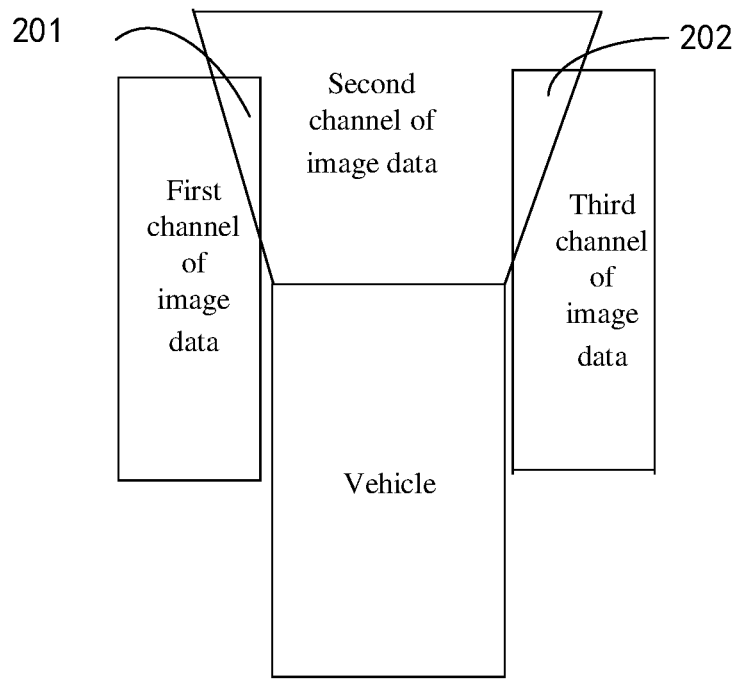
FIG. 2 is a schematic diagram of multiple-channel image data provided in the present disclosure.

It should be noted that FIG. 2 in the present disclosure is only a simple schematic diagram of an example, and does not limit the technical solutions provided in the present disclosure in any way.

In an embodiment, the first common pixel point of the first channel image data and the second channel image data may be extracted by a Speeded up robust features (SURF) feature extraction and a feature matching algorithm. An optimal common pixel point of the first channel image data and the second channel image data may be extracted to improve image stitching effect by setting a threshold, and the threshold may be a Euclidean distance threshold. Thus, it may be determined whether a Euclidean distance between the pixel points of the first channel image data and the second channel image data is less than or equal to the threshold, and if the distance is less than or equal to the threshold, the pixel point is determined to be the common pixel point of the first channel image data and the second channel image data.

It should be noted that, the present disclosure does not limit the extraction of the common pixel point by the SURF feature extraction and the feature matching algorithm. For example, the first common pixel point of the first channel image data and the second channel image data may also be extracted by a Scale-invariant feature transform (SIFT) algorithm.

The creating the first coordinate system based on the first common pixel point may refer to that a new coordinate system is created with the first common pixel point as a reference. Thus, each pixel point of the first channel image data is mapped to this coordinate system with the first common pixel point as the reference, and each pixel point of the second channel image data is also mapped to this coordinate system with the first common pixel point as the reference, so that all the pixel points of the two channels of image data are recalibrated in this coordinate system.

The replicating the first image mapping data and the second image mapping data into the first blank image, respectively, may refer to that, a blank image is created, and then the first image mapping data and the second image mapping data are replicated into the blank image, respectively. The first image mapping data and the second image mapping data are image data in the same coordinate system, so that replicating the first image mapping data and the second image mapping data into the first blank image, respectively, may realize stitching of two pieces of image data in the same coordinate system.

The performing weighted fusion of the overlapping image data of the first image mapping data and the second image mapping data in the first blank image may refer to that, weighted fusion of overlapping pixel points of the first image mapping data and the second image mapping data in the first blank image is performed. Weights of the first image mapping data and the second image mapping data are pre-set and may be set according to actual needs.

The weighted fusion of the overlapping image data is performed, so that it may avoid an unnatural situation where a junction of the stitched image is poorly transitioned because of a light color, thus the overlapping part may be slowly transitioned from one piece of image data to another piece of image data to improve the stitching effect of image stitching.

The stitching of the second channel image data and the third channel image data may refer to the stitching of the first channel image data and the second channel image data. For example, as shown in FIG. 2, the second common pixel point of the third channel image data and the second channel image data may be a pixel point in a region 202 shown in FIG. 2.

The stitching the first stitched sub-image and the second stitched sub-image to obtain the stitched image may refer to stitching in the manner described above for the first stitched sub-image and the second stitched sub-image, or that the first stitched sub-image and the second stitched sub-image are directly stitched. Since the repeat region of the first stitched sub-image and the second stitched sub-image may be exactly the same region, e.g., a middle region of the second channel image data.

Figure 3:
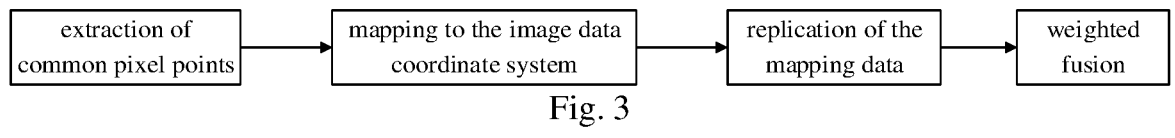
FIG. 3 is a schematic diagram of image stitching provided in the present disclosure.

In the above embodiment, the image stitching process includes the extraction of common pixel points, mapping to the image data coordinate system, replication of the mapping data and the weighted fusion, which may improve the image stitching effect. This may be shown in detail in FIG. 3, the stitched image may be obtained through the extraction of common pixel points, mapping to the image data coordinate system, replication of the mapping data and the weighted fusion.

It should be noted that, the present disclosure does not limit the stitched image to be obtained by the above stitching manner. For example, the stitched image may also be obtained by an image stitching algorithm such as a scale invariant feature transform (SIFT) matching algorithm.

As an optional embodiment, sending the stitched image to the remote cockpit apparatus for controlling the vehicle includes: compressing the stitched image to obtain second image compression information, and sending the second image compression information via RTC to the remote cockpit apparatus for controlling the vehicle.

The compression for the stitched image may be done by H264 compression technology or other compression technologies, which is not limited herein.

The sending the second image compression information via RTC to the remote cockpit apparatus for controlling the vehicle may refer to that, the cloud apparatus sends the second image compression information to the remote cockpit apparatus via the RTC service.

In the present embodiment, the second image compression information is sent to the remote cockpit apparatus via RTC, which reduces transmission latency between the cloud apparatus and the remote cockpit apparatus, and improves safety of remote driving of the vehicle from the remote cockpit apparatus.

Figure 4:
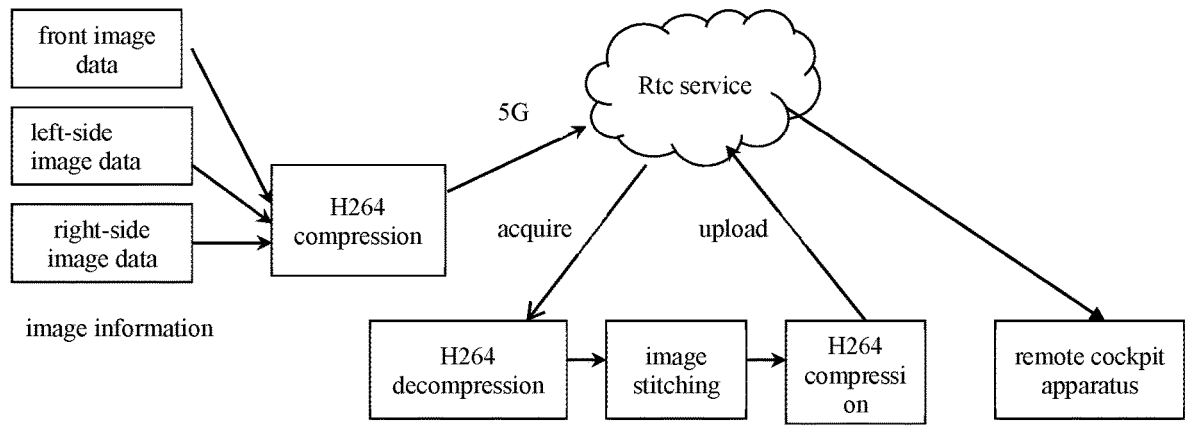
FIG. 4 is a schematic diagram of image processing provided in the present disclosure.

With reference to FIG. 4, a case, where the multiple-channel image data includes left-side image data collected by a left-side camera, front image data collected by a front camera and right-side image data collected by a right-side camera, is illustrated by an example below. As shown in FIG. 4, the vehicle collects left-side image data, front image data and right-side image data, and compresses these image data using H246 compression technology. The image compression information are sent to the cloud apparatus using a 5G network via an RTC service. The cloud apparatus receives the image compression information, decompresses the image compression information using the H264, and stitches the decompressed image data, compresses the stitched image using the H264, and uploads it to the remote cockpit apparatus via the RTC service. The remote cockpit apparatus receives the compressed stitched image, decompresses the image and displays the image, so that the user may operate the vehicle remotely based on the stitched image displayed by the remote cockpit apparatus.

According to the technical solution of the present disclosure, the remote driving effect of the remote cockpit apparatus may be improved since the cloud apparatus stitches the multiple-channel image data sent by the vehicle and sends the stitched image to the remote cockpit apparatus.

Figure 5:
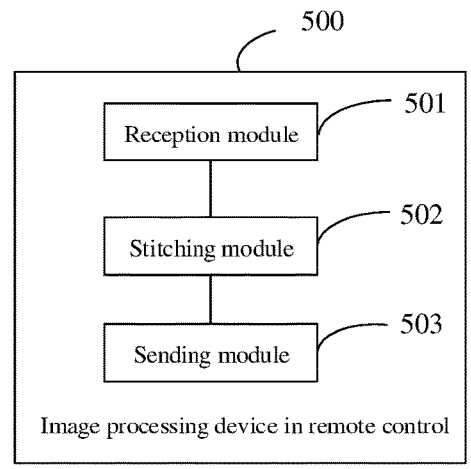
FIG. 5 is a structural diagram of an image processing device in remote control provided in the present disclosure.

Referring to FIG. 5, FIG. 5 illustrates an image processing device provided in the present disclosure, and the device is applied to a cloud apparatus. As shown in FIG. 5, the image processing device 500 includes: a reception module 501, configured to receive image information sent by a vehicle, wherein the image information includes multiple-channel image data collected by the vehicle; a stitching module 502, configured to perform a stitching process on the multiple-channel image data, to obtain a stitched image; a sending module 503, configured to send the stitched image to a remote cockpit apparatus for controlling the vehicle.

Optionally, the reception module 501 is configured to receive first image compression information sent by the vehicle via real-time communication (RTC), wherein the first image compression information includes the multiple-channel image data collected by the vehicle;

The stitching module 502 is configured to perform a decompression process on the first image compression information to obtain the multiple-channel image data, and perform the stitching process on the multiple-channel image data to obtain the stitched image.

Figure 6:
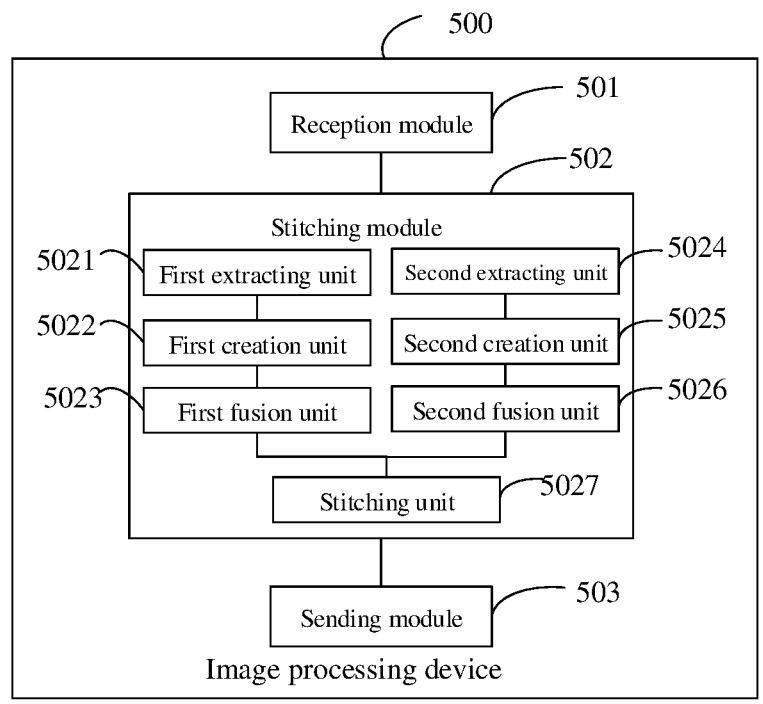
FIG. 6 is another structural diagram of an image processing device in remote control provided in the present disclosure.

Optionally, the multiple-channel image data includes a first channel image data, a second channel image data and a third channel image data. As shown in FIG. 6, the stitching module 502 includes: a first extracting unit 5021, configured to extract a first common pixel point of the first channel image data and the second channel image data; a first creation unit 5022, configured to create a first coordinate system based on the first common pixel point, map the first channel image data to the first coordinate system to obtain first image mapping data, and map the second channel image data to the first coordinate system to obtain second image mapping data; a first fusion unit 5023, configured to replicate the first image mapping data and the second image mapping data into a first blank image, respectively, and perform weighted fusion of overlapping image data of the first image mapping data and the second image mapping data in the first blank image to obtain a first stitched sub-image; a second extracting unit 5024, configured to extract a second common pixel point of the third channel image data and the second channel image data; a second creation unit 5025, configured to create a second coordinate system based on the second common pixel point, map the third channel image data to the second coordinate system to obtain third image mapping data, and map the second channel image data to the second coordinate system to obtain fourth image mapping data; a second fusion unit 5026, configured to replicate the third image mapping data and the fourth image mapping data into a second blank image, respectively, and perform weighted fusion of overlapping image data of the third image mapping data and the fourth image mapping data in the second blank image to obtain a second stitched sub-image; a stitching unit 5027, configured to stitch the first stitched sub-image and the second stitched sub-image to obtain the stitched image.

Optionally, the sending module 503 is configured to compress the stitched image to obtain second image compression information, and send the second image compression information via RTC to the remote cockpit apparatus for controlling the vehicle.

The device provided in the present embodiment is capable of implementing various processes implemented in the method embodiment shown in FIG. 1, and achieves the same beneficial effects. To avoid repetition, details are not described herein again.

According to an embodiment of the present disclosure, the present disclosure further provides an electronic apparatus, a non-transitory computer readable storage medium storing therein computer instructions and a computer program product.

Figure 7:
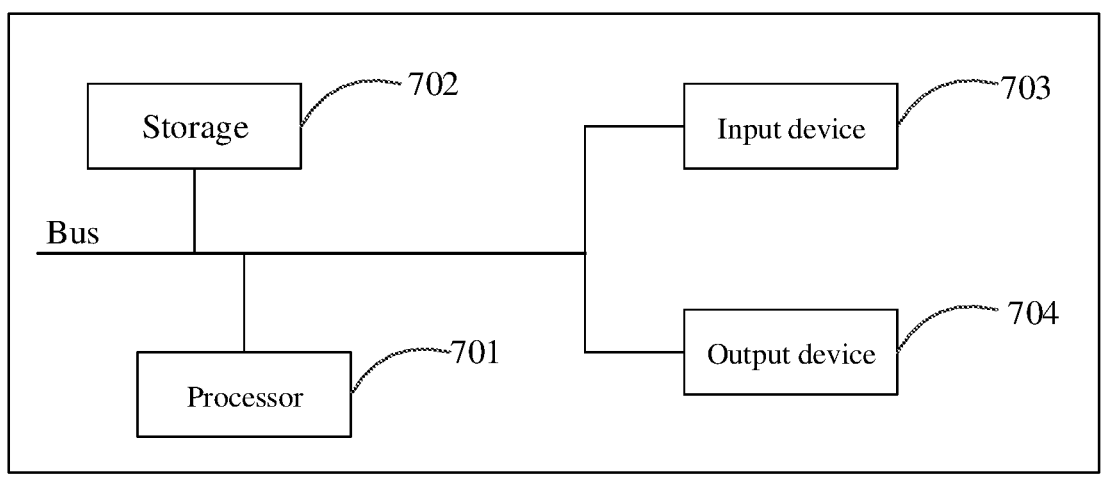
FIG. 7 is a block diagram of an electronic apparatus for implementing an image processing method in remote control of an embodiment of the present application.

As shown in FIG. 7, a block diagram of an electronic apparatus of an image processing method in remote control according to an embodiment of the present disclosure is illustrated. The electronic apparatus is intended to represent all kinds of digital computers, such as a laptop computer, a desktop computer, a work station, a personal digital assistant or other suitable computers. The electronic apparatus may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 7, the electronic apparatus includes: one or more processors 701, a memory 702, and interfaces for connecting various components, including a high-speed interface and a low-speed interface. The various components are interconnected using different buses and may be mounted on a common motherboard or mounted in another manner as desired. The processors may process instructions configured to be executed in the electronic apparatus, and the instructions include instructions stored in the memory or on the memory to display graphical information of GUI on an external input/output apparatus (such as a display apparatus coupled to the interface). In other embodiments, multiple processors and/or multiple buses may be used with multiple memories, if necessary. Also, multiple electronic apparatus may be connected, and each electronic apparatus provides some of the necessary operations (e.g., in a server array, a group of blade servers, or a multi-processor system). FIG. 7 illustrates a single processor 701 as an example.

The memory 702 is a non-transitory computer-readable storage medium provided in the present disclosure. The memory stores therein instructions executable by at least one processor to cause the at least one processor to implement the image processing method according to the present disclosure. The non-transitory computer-readable storage medium of the present disclosure stores therein computer instructions for causing a computer to implement the image processing method provided in the present disclosure.

The memory 702, as a non-transitory computer-readable storage medium, may be used to store non-transitory software programs, non-transitory computer-executable programs, and modules, such as program instructions/modules (e.g., the reception module 501, the stitching module 502 and the sending module 503 shown in FIG. 5) corresponding to the image processing method in the embodiments of the present the present. By executing the non-transitory software programs, instructions and modules stored in the memory 702, the processor 701 performs various functional applications and data processing of the server, i.e., implements the image processing method in the embodiment described above.

The memory 702 may include a program storage area and a data storage area, where the program storage area may store an operating system, and an application program required for at least one function; and the data storage area may store data created according to the usage of the electronic apparatus for implementing the image processing method. In addition, the memory 702 may include a high speed random access memory, and may also include a non-transitory memory, such as at least one magnetic disk storage device, flash memory device, or other non-transitory solid state storage device. In some embodiments, the memory 702 may optionally include a memory remotely located with respect to the processor 701. These remote memories may be connected via a network to the electronic apparatus for implementing the image processing method. Examples of the network mentioned above include, but are not limited to, the Internet, an intranet, a local area network, a mobile communication network, and a combination thereof.

The electronic apparatus for implementing the image processing method may further include: an input device 703 and an output device 704. The processor 701, the memory 702, the input device 703, and the output device 704 may be connected to each other via a bus or in other ways. In FIG. 7, a connection by a bus is taken as an example.

The input device 703 may receive input numeric or character information and generate key signal inputs related to user settings and functional controls of the electronic apparatus for implementing the image processing method. For example, the input device may include a touch screen, a keypad, a mouse, a trackpad, a touch pad, a pointing stick, one or more mouse buttons, a trackball, a joystick, etc. The output device 704 may include a display device, an auxiliary lighting device (e.g., LED), a tactile feedback device (e.g., a vibration motor), etc. The display apparatus may include, but is not limited to, a liquid crystal display (LCD), a light emitting diode (LED) display, and a plasma display. In some embodiments, the display apparatus may be a touch screen.

Various embodiments of the systems and techniques described herein can be implemented in a digital electronic circuit system, an integrated circuit systems, a dedicated ASIC (application specific integrated circuits), computer hardware, firmware, software, and/or combinations thereof. These various embodiments may include implementation in one or more computer programs that may be executed and/or interpreted on a programmable system including at least one programmable processor. The programmable processor may be a dedicated or general purpose programmable processor, and may receive data and instructions from a storage system, at least one input device and at least one output device, and transmit data and the instructions to the storage system, the at least one input device and the at least one output device.

These computing programs (also referred to as programs, software, software applications, or codes) include machine instructions for a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disc, memory, programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship with each other.

The present disclosure provides a computer program product, wherein in a case that the computer program product is executed on an electronic apparatus, the electronic apparatus implements the image processing method provided in the present disclosure.

The present disclosure provides a cloud apparatus including the electronic apparatus provided in the present disclosure.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. An image processing method in remote control, performed by a cloud apparatus, comprising:
   receiving image information sent by a vehicle, wherein the image information comprises multiple-channel image data collected by the vehicle;
   performing a stitching process on the multiple-channel image data to obtain a stitched image; and
   sending the stitched image to a remote cockpit apparatus for controlling the vehicle;
   wherein the multiple-channel image data comprises a first channel image data, a second channel image data and a third channel image data, the performing the stitching process on the multiple-channel image data to obtain the stitched image comprises:
      extracting a first common pixel point of the first channel image data and the second channel image data;
      creating a first coordinate system based on the first common pixel point, mapping the first channel image data to the first coordinate system to obtain first image mapping data, and mapping the second channel image data to the first coordinate system to obtain second image mapping data;
      replicating the first image mapping data and the second image mapping data into a first blank image, respectively, and performing weighted fusion of overlapping image data of the first image mapping data and the second image mapping data in the first blank image to obtain a first stitched sub-image;
      extracting a second common pixel point of the third channel image data and the second channel image data;
      creating a second coordinate system based on the second common pixel point, mapping the third channel image data to the second coordinate system to obtain third image mapping data, and mapping the second channel image data to the second coordinate system to obtain fourth image mapping data;
      replicating the third image mapping data and the fourth image mapping data into a second blank image, respectively, and performing weighted fusion of overlapping image data of the third image mapping data and the fourth image mapping data in the second blank image to obtain a second stitched sub-image; and
      stitching the first stitched sub-image and the second stitched sub-image to obtain the stitched image.

2. The method according to claim 1, wherein:
   the receiving the image information sent by the vehicle comprises receiving first image compression information sent by the vehicle via real-time communication (RTC), wherein the first image compression information comprises the multiple-channel image data collected by the vehicle; and
   performing the stitching process on the multiple-channel image data comprises performing a decompression process on the first image compression information to obtain the multiple-channel image data, and performing the stitching process on the multiple-channel image data to obtain the stitched image.

3. The method according to claim 1, wherein sending the stitched image to the remote cockpit apparatus for controlling the vehicle comprises:
   compressing the stitched image to obtain second image compression information, and sending the second image compression information via RTC to the remote cockpit apparatus for controlling the vehicle.

4. An electronic apparatus, comprising:
   at least one processor; and
   a storage communicatively connected to the at least one processor, wherein,
   instructions executable by the at least one processor are stored in the storage, the instructions are performed by the at least one processor to cause the at least one processor to perform an image processing method in remote control, the method comprising,
   receiving image information sent by a vehicle, wherein the image information comprises multiple-channel image data collected by the vehicle;
   performing a stitching process on the multiple-channel image data to obtain a stitched image;
   sending the stitched image to a remote cockpit apparatus for controlling the vehicle;
   wherein the multiple-channel image data comprises a first channel image data, a second channel image data and a third channel image data, the performing the stitching process on the multiple-channel image data to obtain the stitched image comprises:
      extracting a first common pixel point of the first channel image data and the second channel image data;
      creating a first coordinate system based on the first common pixel point, mapping the first channel image data to the first coordinate system to obtain first image mapping data, and mapping the second channel image data to the first coordinate system to obtain second image mapping data;
      replicating the first image mapping data and the second image mapping data into a first blank image, respectively, and performing weighted fusion of overlapping image data of the first image mapping data and the second image mapping data in the first blank image to obtain a first stitched sub-image;
      extracting a second common pixel point of the third channel image data and the second channel image data;
      creating a second coordinate system based on the second common pixel point, mapping the third channel image data to the second coordinate system to obtain third image mapping data, and mapping the second channel image data to the second coordinate system to obtain fourth image mapping data;
      replicating the third image mapping data and the fourth image mapping data into a second blank image, respectively, and performing weighted fusion of overlapping image data of the third image mapping data and the fourth image mapping data in the second blank image to obtain a second stitched sub-image; and
      stitching the first stitched sub-image and the second stitched sub-image to obtain the stitched image.

5. The electronic apparatus according to claim 4, wherein:
   receiving the image information sent by the vehicle comprises receiving first image compression information sent by the vehicle via real-time communication (RTC), wherein the first image compression information comprises the multiple-channel image data collected by the vehicle; and performing the stitching process on the multiple-channel image data comprises performing a decompression process on the first image compression information to obtain the multiple-channel image data, and performing the stitching process on the multiple-channel image data to obtain the stitched image.

6. The electronic apparatus according to claim 4, wherein sending the stitched image to the remote cockpit apparatus for controlling the vehicle comprises:

compressing the stitched image to obtain second image compression information, and sending the second image compression information via RTC to the remote cockpit apparatus for controlling the vehicle.

7. A non-transitory computer readable storage medium, storing therein computer instructions to cause a computer to perform an image processing method in remote control, the method comprising:

receiving image information sent by a vehicle, wherein the image information comprises multiple-channel image data collected by the vehicle;

performing a stitching process on the multiple-channel image data to obtain a stitched image; and sending the stitched image to a remote cockpit apparatus for controlling the vehicle;

wherein the multiple-channel image data comprises a first channel image data, a second channel image data and a third channel image data, the performing the stitching process on the multiple-channel image data to obtain the stitched image comprises:

extracting a first common pixel point of the first channel image data and the second channel image data;

creating a first coordinate system based on the first common pixel point, mapping the first channel image data to the first coordinate system to obtain first image mapping data, and mapping the second channel image data to the first coordinate system to obtain second image mapping data;

replicating the first image mapping data and the second image mapping data into a first blank image, respectively, and performing weighted fusion of overlapping image data of the first image mapping data and the second image mapping data in the first blank image to obtain a first stitched sub-image;

extracting a second common pixel point of the third channel image data and the second channel image data;

creating a second coordinate system based on the second common pixel point, mapping the third channel image data to the second coordinate system to obtain third image mapping data, and mapping the second channel image data to the second coordinate system to obtain fourth image mapping data;

replicating the third image mapping data and the fourth image mapping data into a second blank image, respectively, and performing weighted fusion of overlapping image data of the third image mapping data and the fourth image mapping data in the second blank image to obtain a second stitched sub-image; and stitching the first stitched sub-image and the second stitched sub-image to obtain the stitched image.

8. The storage medium according to claim 7, wherein:

receiving the image information sent by the vehicle comprises receiving first image compression information sent by the vehicle via real-time communication (RTC), wherein the first image compression information comprises the multiple-channel image data collected by the vehicle; and performing the stitching process on the multiple-channel image data comprises performing a decompression process on the first image compression information to obtain the multiple-channel image data, and performing the stitching process on the multiple-channel image data to obtain the stitched image.

9. The storage medium according to claim 7, wherein sending the stitched image to the remote cockpit apparatus for controlling the vehicle comprises:

compressing the stitched image to obtain second image compression information, and sending the second image compression information via RTC to the remote cockpit apparatus for controlling the vehicle.

10. A cloud apparatus, comprising the electronic apparatus according to claim 4.

* * * * *